United States Patent
Taniyama et al.

(10) Patent No.: US 9,515,359 B2
(45) Date of Patent: Dec. 6, 2016

(54) AIR-CONDITIONING CONTROLLING APPARATUS FOR A BATTERY PACK

(75) Inventors: Koichi Taniyama, Minato-ku (JP); Hiroshi Tanada, Tokyo (JP); Yoshio Tagawa, Tokyo (JP); Takuya Miyashita, Tokyo (JP); Hajime Tsunekawa, Tokyo (JP); Keigo Atobe, Tokyo (JP); Masahiko Hibino, Tokyo (JP); Mao Tamaru, Tokyo (JP); Kaori Nagata, Tokyo (JP); Koji Kitada, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 466 days.

(21) Appl. No.: 13/983,986

(22) PCT Filed: Apr. 23, 2012

(86) PCT No.: PCT/JP2012/060827
§ 371 (c)(1),
(2), (4) Date: Sep. 25, 2013

(87) PCT Pub. No.: WO2012/160922
PCT Pub. Date: Nov. 29, 2012

(65) Prior Publication Data
US 2014/0023905 A1    Jan. 23, 2014

(30) Foreign Application Priority Data
May 23, 2011    (JP) .................... 2011-115111

(51) Int. Cl.
| | |
|---|---|
| H01M 10/60 | (2014.01) |
| H01M 10/613 | (2014.01) |
| B60L 1/00 | (2006.01) |
| B60L 11/18 | (2006.01) |
| H01M 10/48 | (2006.01) |

(Continued)

(52) U.S. Cl.
CPC .......... H01M 10/5004 (2013.01); B60L 1/003 (2013.01); B60L 11/1874 (2013.01);
(Continued)

(58) Field of Classification Search
CPC ....................................................... H01M 6/50
See application file for complete search history.

(56) References Cited

U.S. PATENT DOCUMENTS 5,834,132 A * 11/1998 Hasegawa .......... B60H 1/00278
429/120
7,704,638 B2    4/2010  Funahashi et al.
(Continued)

FOREIGN PATENT DOCUMENTS

| | | |
|---|---|---|
| DE | 10 2004 021 280 B3 | 6/2005 |
| JP | 2007-200758 A | 8/2007 |

(Continued)

*Primary Examiner* — Jacob Marks
(74) *Attorney, Agent, or Firm* — Birch, Stewart, Kolasch & Birch, LLP

(57) ABSTRACT

A heat removal unit that removes heat from air in a battery pack in which a battery cell is accommodated to cool or dehumidify the air is provided.

Further, a circulation route that connects the battery pack and the heat removal unit to each other to recirculate the air is provided.

Furthermore, a direction controller that controls a flow direction of the air in the circulation route in opposite direction upon cooling and upon dehumidification is provided.

8 Claims, 6 Drawing Sheets

(51) Int. Cl.
  *H01M 10/625* (2014.01)
  *H01M 10/633* (2014.01)
  *H01M 10/663* (2014.01)
  *H01M 10/6565* (2014.01)
  *H01M 10/6566* (2014.01)
  *H01M 2/10* (2006.01)

(52) U.S. Cl.
  CPC ....... *B60L 11/1877* (2013.01); *H01M 10/482* (2013.01); *H01M 10/486* (2013.01); *H01M 10/613* (2015.04); *H01M 10/625* (2015.04); *H01M 10/633* (2015.04); *H01M 10/6565* (2015.04); *H01M 10/6566* (2015.04); *H01M 10/663* (2015.04); *B60L 2240/545* (2013.01); *H01M 2/1077* (2013.01); *H01M 2220/20* (2013.01); *Y02T 10/7005* (2013.01); *Y02T 10/705* (2013.01)

(56) References Cited

U.S. PATENT DOCUMENTS

| | | |
|---|---|---|
| 2008/0299451 A1 | 12/2008 | Funahashi et al. |
| 2009/0305125 A1 | 12/2009 | Kosugi et al. |
| 2010/0236846 A1* | 9/2010 | Kramer ............... H01M 10/613 180/65.21 |

FOREIGN PATENT DOCUMENTS

| | | |
|---|---|---|
| JP | 2008-204991 A | 9/2008 |
| JP | 2008-300144 A | 12/2008 |
| JP | 2009-110829 A | 5/2009 |
| JP | 2010-277767 A | 12/2010 |
| JP | 2010-280288 A | 12/2010 |
| KR | 10-2006-0068931 A | 6/2006 |
| KR | 10-2008-0053717 A | 6/2008 |

\* cited by examiner

AIR-CONDITIONING CONTROLLING APPARATUS FOR A BATTERY PACK

TECHNICAL FIELD

The present invention relates to an air-conditioning controlling apparatus that controls the temperature and the humidity in a battery pack in which a battery cell is accommodated.

BACKGROUND ART

Conventionally, an electric car and a hybrid car wherein the vehicle is driven using electric power stored in a battery such as a lithium-ion battery or a nickel-hydrogen battery have been developed. Especially, the lithium-ion battery that exhibits a high energy density is easy to promote the reduction in size and weight in comparison with the battery capacity. It is expected that demand for the lithium-ion battery increases as a battery for driving a vehicle for which high electric power is desired.

A popular lithium-ion battery mounted on a vehicle includes an airtight and watertight structure by which electrodes and electrolyte are sealed in a case made of metal. For example, Patent Document 1 discloses a battery pack wherein a plurality of unit cells (battery cells) is hermetically closed in a metal case sealed from the external air. It is described that the rigidity of the unit cells can be improved by using a metal case in this manner.

Incidentally, as the total capacity of a battery mounted on a vehicle increases, the energy that can be used increases, and therefore, the cruising range of the vehicle (maximum distance over which it is estimated that the vehicle can travel by the amount of charge by a single time charging operation) increases. On the other hand, since the vehicle weight increases as the mounted quantity of batteries increases, the energy spent for driving the vehicle increases and both the rate of electric consumption and the cruising range decrease. Accordingly, if the weight of the battery itself can be reduced, then it becomes possible to utilize a greater amount of energy as the driving energy for the vehicle and improve the traveling performance of the vehicle while curbing the vehicle weight increase.

Therefore, in recent years, it has been proposed to use, as a case for a battery, a case made of a resin (plastic, resinoid) in place of a metal case. For example, as described in Patent Document 2, it has been studied to form a cell battery case (vessel) for a battery as a polypropylene case to assure requested rigidity and achieve reduction in weight and cost.

PRIOR ART DOCUMENT

Patent Document

Patent Document 1:
Japanese Laid-open Patent Publication No. 2007-200758
Patent Document 2:
Japanese Laid-open Patent Publication No. 2008-300144

SUMMARY OF THE INVENTION

Technical Problems

However, if a case for a battery is made of a resin, then there is a problem that it is difficult to maintain sufficiently high water-tightness and to suppress degradation of the battery. Especially, in the case of a lithium-ion battery, invasion of water through a wall face of a resin case causes decomposition of the electrolyte and this decomposition makes a cause of capacity degradation and lifetime degradation. Therefore, advanced water-tightness is demanded. It is difficult to implement such advanced water-tightness by using a case made of a resin. On the other hand, where a case made of metal is used, although it is possible to assure the water-tightness, the weight of the battery increases, and the traveling performance of the vehicle cannot be improved.

Taking such subjects as described above into consideration, it is one of objects of the present case to appropriately control the temperature environment and the humidity environment to suppress degradation of a battery.

It is to be noted that, in addition to this object, also it can be positioned as another object of the present case to achieve working-effects that are led out from various configurations indicated by a mode for carrying out the invention hereinafter described but cannot be achieved by the related art.

Solution to Problems (1) The air-conditioning controlling apparatus for a battery pack disclosed herein includes a heat removal unit that removes heat from air in a battery pack in which a battery cell is accommodated to cool or dehumidify the air. The air-conditioning controlling apparatus further includes a circulation route that connects the battery pack and the heat removal unit to each other to recirculate the air. The air-conditioning controlling apparatus further includes a direction controller that controls a flow direction of the air in the circulation route in opposite direction upon cooling and upon dehumidification.

(2) Preferably, the air-conditioning controlling apparatus further includes a heat exchange unit provided on the circulation route on the upstream side with respect to the heat removal unit upon the cooling and performs heat exchange between the air and external air. The heat exchange unit functions as a cooler upon cooling and functions as a humidifier upon dehumidification.

(3) Preferably, the air-conditioning controlling apparatus further includes an air-conditioning controller that performs cooling control for cooling the air upon charging or discharging of the battery cell and performs dehumidification control for dehumidifying the air after the charging ends.

(4) In this case, preferably the air-conditioning controller decreases a flow rate of air to be circulated in the circulation route upon the dehumidification control from a flow rate of air to be circulated in the circulation route upon the cooling control.

(5) Meanwhile, preferably the air-conditioning controlling apparatus further includes a bypass route that allows dew condensation sticking to the heat removal unit upon the dehumidification to flow out from the circulation route.

(6) Preferably, the air-conditioning controlling apparatus further includes a first inlet port provided in an upper part of the battery pack and introduces, upon the cooling of the air, the air from the circulation route into the battery pack, and a second inlet port provided in a lower part of the battery pack and introduces, upon the dehumidification of the air, the air from the circulation route into the battery pack.

(7) In this instance, preferably the first inlet port is provided at a plurality of locations of an upper face of the battery pack and supplies the air toward the entire battery cell accommodated in the battery pack. Further, preferably the second inlet port is provided at a corner portion of the battery pack and supplies the air in layers from the lower face side of the battery pack.

Advantageous Effects

With the air-conditioning controlling apparatus for a battery pack disclosed herein, by circulating the air in the opposite directions upon cooling and upon dehumidification, the temperature of the air cooled by the heat removal unit when the air is introduced into the battery pack can be made different and the temperature and the humidity of the air in the battery pack can be adjusted. Consequently, while the battery is cooled efficiently, it can be dried, and degradation of the battery can be suppressed.

DESCRIPTION OF EMBODIMENTS

An air-conditioning controlling apparatus for a battery pack of an embodiment is described with reference to the drawings. It is to be noted that the embodiment described below is a mere example to the end, and there is no intension to exclude various modifications and technical applications that are not demonstrated by the following embodiment. Further, the configurations of the embodiment described below can be selectively used as occasion demands or may be combined suitably and can be carried out in various modified forms without departing from the spirit and scope of the embodiment.

[1. Apparatus Configuration]

Figure 1:
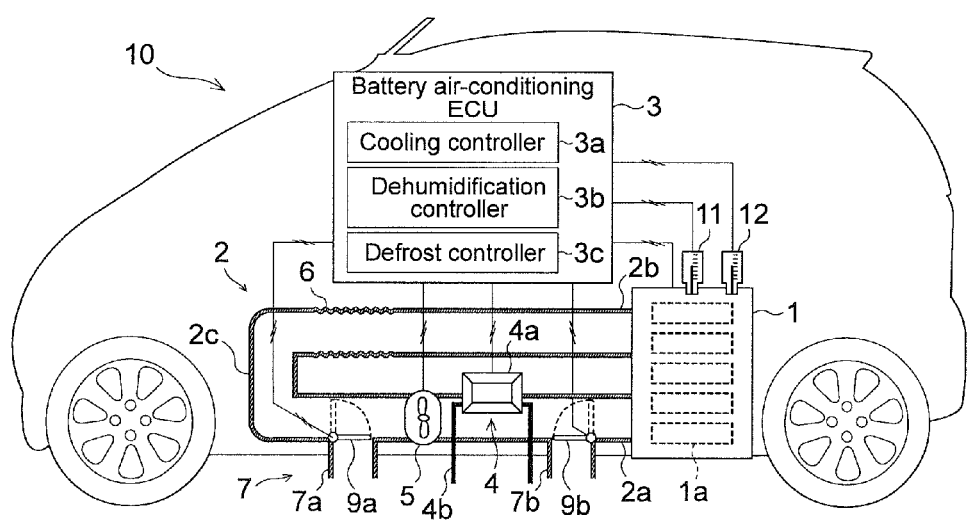
FIG. 1 is a schematic view illustrating a general configuration of a vehicle to which an air-conditioning controlling apparatus according to an embodiment is applied.

The air-conditioning controlling apparatus for a battery pack of the present embodiment is applied to a vehicle 10 shown in FIG. 1. This vehicle 10 is an electric car that travels by driving a motor unit not shown by electric power of a battery. This motor unit is a motor generator including both of a function (motor function and generator function) of consuming electric power of the battery to drive wheels to rotate and a function of regenerating electric power by power generation utilizing torque of the wheels upon braking. The two functions are suitably controlled in response to a traveling state of the vehicle 10.

The battery is accommodated as a plurality of battery cells 1a in a battery pack 1. The battery pack 1 is a vessel made of a resin (plastic, resinoid) and having predetermined airtightness and water-tightness and is formed such that mud, water drops or the like on the road surface may not be admitted (may not invade the battery). Meanwhile, a wall face of the battery pack 1 is made of a resin, and there is the possibility that a very small amount of water (moisture, dew condensation) may be admitted into the resin. Therefore, in the present embodiment, the temperature and the humidity (amount of water vapor) of air existing in the inside of the battery pack 1 are controlled.

As illustrated in FIG. 1, a circulation route 2 for circulating internal air thereof only in the inside thereof is connected annularly to the battery pack 1. The circulation route 2 is connected at two locations of a first connecting portion 2a and a second connecting portion 2b to the battery pack 1. An evaporator 4, a fan 5, a heat exchange unit 6 for interchanging heat with the outside air and a bypass route 7 are provided on the circulation route 2. Further, a battery air-conditioning ECU (Electronic Control Unit) 3 for controlling the evaporator 4, fan 5 and so forth is provided.

[1-1. Evaporator]

The evaporator 4 (heat removal unit) is a heat exchanger that removes heat from the air in the circulation route 2. The evaporator 4 includes a core 4a and a coolant pipe 4b. The coolant pipe 4b supplies coolant, which is vaporized by an expansion valve not illustrated, to the core 4a. Further, in the inside of the core 4a, a plurality of fins along which the coolant supplied from the coolant pipe 4b circulates are provided in a juxtaposed relationship at predetermined distances from each other, and the coolant circulating in the core 4a removes heat from the air circulating between the fins to cool the air. It is to be noted that the coolant of the air-conditioning apparatus of the vehicle 10 may be used as the coolant of the evaporator 4.

The evaporator 4 has two functions. The first function is a function of cooling the air. For example, it is assumed that the first function has capability (ability) of cooling the air in the circulation route 2 of 30 to 40 [° C.] warmed by heat generation of the battery cells 1a to approximately 10 to 15 [° C.]. The second function is a function of condensing water vapor in the air. For example, it is assumed that the second function has cooling capability (ability) by which the surface temperature of the core 4a becomes lower than approximately −10 [° C.] (temperature lower than a general outside air temperature) in order to condense moisture in the air of approximately 20 [° C.] into dew. The evaporator 4 is configured so as to permit or block circulation of the coolant to the core 4a based on a control signal from the battery air-conditioning ECU 3 such that, when the coolant is blocked, the cooling function and the moisture condensation function stop.

Further, the disposedposition of the evaporator 4 is a position displaced to one side from an intermediate point 2c of a route between the first connecting portion 2a and the second connecting portion 2b of the circulation route 2. (The evaporator 4 is located at a biased position toward the intermediate point 2c.) In the present embodiment, the evaporator 4 exemplified as illustrated in FIG. 1 is provided at a position displaced to the first connecting portion 2a from the intermediate point 2c. (The evaporator 4 is located at a closer position to the first connecting portion 2a than the intermediate point 2c in FIG. 1.)

[1-2. Fan]

The fan 5 (direction controller) is an air-blowing apparatus for recirculating the air in the circulation route 2 and is formed such that the discharging direction of the air can be reversed in response to the direction of rotation of a motor built therein. In the following, with regard to the circulation direction of the air discharged from the fan 5, the direction in which the air is provided (by the fan 5) to the first connecting portion 2a side and discharged from the second connecting portion 2b side is referred to as forward direction, and the circulation direction in which the air is provided (by the fan 5) to the second connecting portion 2b side and discharged from the first connecting portion 2a side is referred to as reverse direction (opposite direction). The fan 5 functions to blow the air in the circulation route 2 in the forward direction or the reverse direction on the basis of a control signal from the battery air-conditioning ECU 3.

Different from the case of the evaporator 4, the disposed position of the fan 5 on the circulation route 2 can be determined arbitrarily. That is, the fan 5 may be provided on the first connecting portion 2a side with respect to the intermediate point 2c or may be provided on the second connecting portion 2b side. Accordingly, the positional relationship between the fan 5 and the evaporator 4 can be determined arbitrarily. Further, an air-blowing efficiencies (air-blowing rates) in the forward direction and the reverse direction by the fan 5 are set such that the air-blowing efficiency in the forward direction is higher than the blowing efficiency in the reverse direction.

[1-3. Heat Exchange Unit]

The heat exchange unit 6 (heat exchanging unit) is a part wherein the pipe wall of the circulation route 2 is formed in a shape of bellows (accordion-like shape) and is apart for performing heat exchange between the air in the circulation route 2 and the external air. This heat exchange unit 6 is provided at a position at which the external air contacts with an outer periphery thereof. The disposed position of the heat exchange unit 6 with the external air on the circulation route 2 is an arbitrary position on the first connecting portion 2a side with respect to the evaporator 4. It is to be noted that, where the pipe wall itself of the circulation route 2 includes a sufficient thermal conductivity, processing of the pipe wall is not requested. A region of the circulation route 2 at which it contacts with the external air may be referred to as merely as heat exchange unit 6.

Two different functions are provided for the heat exchange unit 6. The first function is a function of cooling the air circulating from the battery pack 1 side. For example, when air of a temperature higher than the external air temperature circulates from the battery pack 1 side, the heat exchange unit 6 cools the air with the external air. The second function is a function of raising the temperature (heating) of the air circulating from the evaporator 4 side. For example, when the air of a temperature lower than the external air temperature circulates from the evaporator 4 side, the heat exchange unit 6 warms the air with the external air.

In this manner, the heat exchange unit 6 is a part which performs different works in response to the circulation direction of the air in the circulation route 2 and functions as a cooler upon cooling of the air but functions as a heater upon dehumidification of the air.

[1-4. Bypass Route, Flow Path Switching Valve]

The bypass route 7 is a passage for discharging moisture having been included in the air in the circulation route 2 to the outside of the circulation route 2. In the example illustrated in FIG. 1, two bypass routes 7 are formed such that it branches from the circulation route 2 to a downward direction of the vehicle 10. Each of the bypass routes 7 is open at an extremity thereof to the external air. One 7a of the bypass paths is disposed on the second connecting portion 2b side with respect to the fan 5 while the other bypass path 7b is disposed on the first connecting portion 2a side with respect to the evaporator 4. Further, a flow path switching valve 9 for controlling the flow direction of the air is provided at each of the branching points between the bypass routes 7 and the circulation route 2.

The flow path switching valve 9 can be switched to two positions of a posture in which the bypass route 7 is closed, and another posture in which the bypass route 7 is open and the circulation route 2 is closed. The flow path switching valve 9a provided in the bypass route 7a is controlled to two postures including a posture in which it closes the bypass route 7a and another posture in which it opens the bypass route 7a only in the direction toward the fan 5 of the circulation route 2.

In contrast, the flow path switching valve 9b provided in the other bypass route 7b is controlled to two positions including a posture in which it closes the bypass route 7b and another posture in which it opens the bypass route 7b only in a direction toward the evaporator 4 of the circulation route 2. Accordingly, if both of the two bypass routes 7a and 7b are opened as indicated by broken lines in FIG. 1, then the locations of the circulation route 2 at which the evaporator 4 and the fan 5 are interposed and the two bypass routes 7a and 7b are communicated with each other.

[1-5. Battery Pack]

Figure 2A:
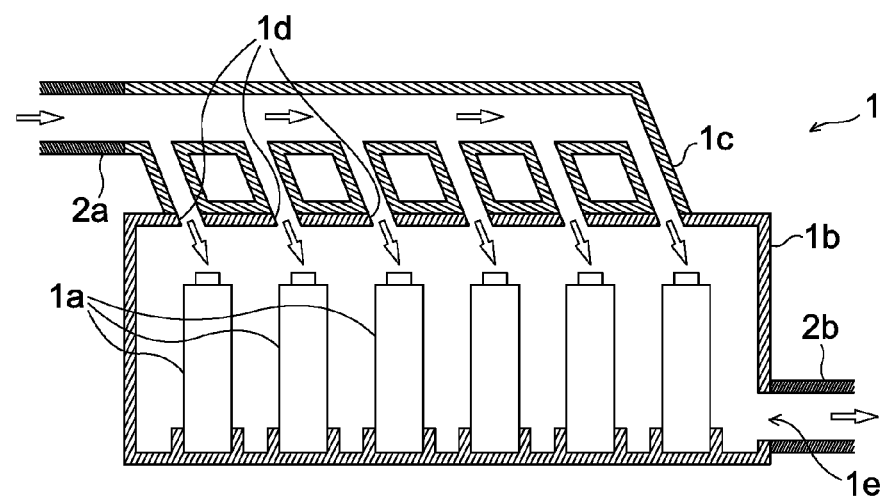
FIGS. 2A and 2B are vertical sectional views exemplifying a cross sectional structure of a battery (battery pack) mounted on the vehicle of FIG. 1.

As illustrated in FIG. 2A, the battery pack 1 includes a case main body 1b which accommodates the battery cells 1a therein and a branch pipe 1c fixed so as to cover the case main body 1b from above. The first connecting portion 2a of the circulation route 2 is connected to the branch pipe 1c, and the second connecting portion 2b is connected to the case main body 1b. Meanwhile, at arbitrary positions of the case main body 1b, a temperature sensor 11 (temperature detection unit) that detects the battery temperature T of the battery cells 1a (or the temperature of the air in the case main body 1b) and a humidity sensor 12 (humidity detection unit) that detects the internal humidity (water vapor amount) of the case main body 1b are provided.

The branch pipe 1c is a part that serves as a passage that connects the circulation route 2 and the case main body 1b to each other. The branch pipe 1c has a shape of a manifold wherein the case main body 1b side thereof is branched into a plurality of portions such that, when air is introduced into the branch pipe 1c from the first connecting portion 2a side, the air is supplied to the entire battery cells 1a. Inlet ports 1d formed at the branches are provided at positions suitable for the disposition of the battery cells 1a in the case main body 1b.

Meanwhile, a second inlet port 1e to which the second connecting portion 2b is connected is provided at a corner portion (outer end of bottom, angle recess portion) in the proximity of a lower face of the case main body 1b such that, when air is introduced from the second connecting portion 2b side, the air is filled in layers from the lower face side of the case main body 1b.

[2. Control Configuration]

The battery air-conditioning ECU 3 (air-conditioning controller) is an electronic controller unit configured from a microcomputer. The battery air-conditioning ECU 3 is configured, for example, as an LSI device or a built-in electronic device in which a well-known microprocessor, a ROM (Read-Only memory), a RAM (Random access memory) and so forth are integrated. The battery air-conditioning ECU 3 is connected to the battery pack 1, temperature sensor 11 and humidity sensor 12 through signal lines, and information relating to a state of charge of the battery cells 1a, an amount A of current value relating to charging or discharging, temperature information of the battery pack 1, humidity information of the battery pack 1 and so forth is imparted at any time.

It is to be noted that, in the case of a vehicle in which an electronic controller (so-called battery ECU, EV-ECU (Electric Vehicle ECU) or the like) that is responsible for overall charging control is mounted on the vehicle, various information mentioned hereinabove may be acquired from the electronic controller. The control target devices of the battery air-conditioning ECU 3 are the evaporator 4, fan 5 and flow path switching valve 9. The battery air-conditioning ECU 3 controls the control target devices in response to the state of charge, the temperature of the battery pack 1 and so forth.

[2-1. Outline of Control]

The battery air-conditioning ECU 3 performs three kinds of control including; cooling control, dehumidification control, and defrost control.

The cooling control is control of supplying air of a low temperature into the battery pack 1 to cool the battery pack 1. The cooling control is performed, for example, in a state in which the heat generation amount upon charging or discharging of the battery cells 1a is great (upon fast charging, upon regeneration charging, when the current value A is high or in a like case).

The dehumidification control is control of dehumidifying the air in the battery pack 1 to dry the air. The dehumidification control is performed, for example, after the cooling control ends. In this dehumidification control, moisture included in the air in the circulation route 2 is condensed into dew (condensation) or frosted on the evaporator 4 to perform dehumidification.

The defrost control is control of discharging condensed dew or frosted moisture to the outside of the circulation route 2. The defrost control is performed, for example, after the dehumidification control ends. In this defrost control, supply of the coolant to the evaporator 4 is cut off to stop the cooling function and the frost is flown off (dried off or blown off) by the external air to perform defrost.

As software or hardware for performing the kinds of control described above, a cooling controller 3a, a dehumidification controller 3b and a defrost controller 3c are provided in the battery air-conditioning ECU 3.

[2-2. Controlling Block Configuration]

The cooling controller 3a is responsible for the cooling control. The cooling controller 3a decides (judges) a starting condition and an ending condition for the cooling control, and performs the cooling control based on a result of the decision (judgment). The starting condition for the cooling control can be determined arbitrarily and may be, for example, that the battery cells 1a are being charged, that the battery temperature T detected by the temperature sensor 11 is equal to or higher than a criterional temperature or the like. Meanwhile, the ending condition may be, for example, that the battery cells 1a are not being charged (for example, the amount of charge has become equal to or greater than the criterional amount), that the battery temperature T detected by the temperature sensor 11 is lower than a criterional temperature or the like.

Figure 3:
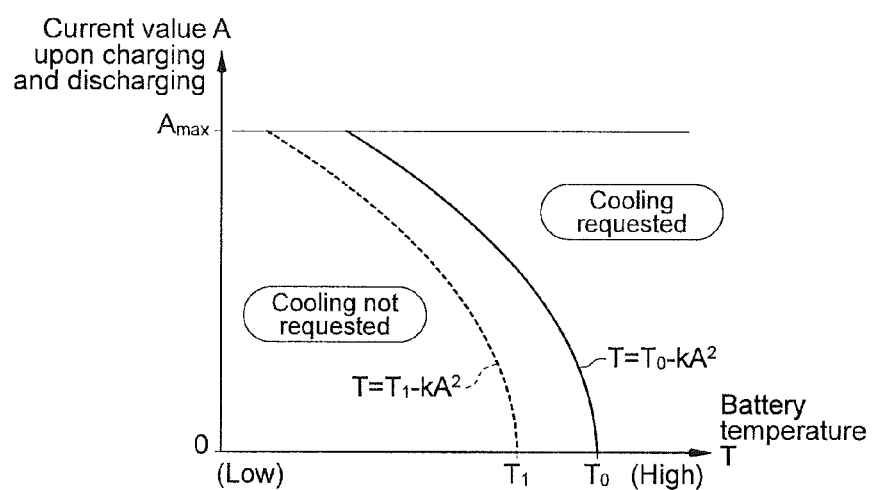
FIG. 3 is a graph illustrating a starting condition for cooling control performed by the air-conditioning controlling apparatus of FIG. 1.

In the present embodiment, the starting condition and the ending condition of the cooling control are decided based on the state of charge of the battery cells 1a, the battery temperature T and the current value A of the battery. For example, the cooling controller 3a stores a control map that defines such a relationship between the battery temperature T and the current value A and whether or not cooling is requested as illustrated in FIG. 3. The cooling controller 3a decides, when the battery cells 1a are being charged, whether or not the cooling control is to be performed or not to be performed based on the control map.

The heat generation amount of the battery cells 1a increases in proportion to the square of the current value A upon charging or discharging. Therefore, in the control map of FIG. 3, a decision threshold value for the battery temperature T for performing the cooling control is set so as to decrease in proportion to the square of the current value A ($T=T_0-kA^2$, k is a coefficient). When the current value A is 0, the starting condition for the cooling control is satisfied when the battery temperature T is equal to or higher than the decision temperature $T_0$. When the current value A is higher than 0, the starting condition for the cooling control is satisfied in the case of the battery temperature T is equal to or higher than the reference temperature $T_0-kA^2$, that is lower than the decision temperature $T_0$ by the temperature $kA^2$ which increases in proportion to the square of the current value A. The reference temperature $T_0-kA^2$ decreases as the current value A increases. The maximum value $A_{max}$ of the current value A in FIG. 3 corresponds to a maximum current value upon charging or discharging.

It is to be noted that, although it can be seen that the graph $T=T_0-kA^2$ indicated by a single solid line in FIG. 3 provides a decision threshold value for both of the starting condition and the ending condition for the cooling control, the starting condition and the ending condition may be made different from each other. That is, a function (numerical formula) that provides a decision threshold value for the starting condition and a function (numerical formula) that provides a decision threshold value for the ending condition may be made different from each other. For example, such a decision threshold value with which, when the current value A is 0, the ending condition for the cooling control is satisfied when the battery temperature T is lower than a second decision temperature $T_1$ that is lower than the decision temperature $T_0$ as indicated by a broken line in FIG. 3 may be set. By making the starting condition and the ending condition different from each other, control hunting (that controls are repeated alternately in short time, hunting reaction) is prevented and the controllability is improved.

If the starting condition for the cooling control is satisfied, then the cooling controller 3a outputs a control signal to the evaporator 4 so that the coolant is circulated to the core 4a and outputs a control signal to the fan 5 to blow air in the circulation route 2 in the forward direction. Further, the flow path switching valves 9a and 9b are controlled to the postures in which they close the bypass routes 7a and 7b, respectively.

Consequently, the air cooled on the surface of the evaporator 4 is supplied from the plurality of inlet ports 1d into the case main body 1b of the battery pack 1 through the first connecting portion 2a. On the other hand, the air in the case main body 1b is communicated from the second connecting portion 2b into the circulation route 2 through the second inlet port 1e and cooled by the heat exchange unit 6 and then further cooled by the evaporator 4.

The dehumidification controller 3b is responsible for the dehumidification control. Here, the starting condition and the ending condition for the dehumidification control are decided (judged), and the dehumidification control is performed based on results of the decision (judgment). The starting condition for the dehumidification control is, for example, that the cooling control ends, that the cooling control has been performed continuously for more than a criterional period of time, that the humidity B in the battery pack 1 detected by the humidity sensor 12 is equal to or higher than a criterional humidity $B_0$, or the like. Meanwhile, the ending condition is, for example, that the performance time period of the dehumidification control is equal to or longer than a criterional period of time, that the humidity B in the battery pack 1 drops to a humidity lower than the criterional humidity $B_0$ or the like.

If the starting condition for the dehumidification control is satisfied, then the dehumidification controller 3b outputs a control signal to the evaporator 4 to circulate the coolant to the core 4a. The dehumidification controller 3b also outputs a control signal to the fan 5 to blow the air in the circulation route 2 in the reverse direction. In other word, the dehumidification controller 3b controls the fun 5 so that the air is circulated in the opposite direction from the cooling controller 3a. Since the air-blowing efficiency of the fan 5 in the reverse direction is set so as to be lower than that of the forward direction, the flow rate of the air circulated in the circulation route 2 upon dehumidification control decreases in comparison with that upon cooling control. Further, the flow path switching valves 9a and 9b are controlled to the postures in which they close the bypass routes 7a and 7b, respectively.

Consequently, moisture in the air cooled by the evaporator 4 is condensed into dew or frosted on the surface of the core 4a, and the humidity descends. Further, the air is heated by the heat exchange unit 6 and circulated to the second connecting portion 2b side and is supplied from the second inlet port 1e to the inside of the case main body 1b of the battery pack 1. In the inside of the case main body 1b, dried and rather cold air is filled in layers from the lower face side (from a lower part of the battery pack). Meanwhile, the remaining air in the inside of the case main body 1b is pushed upwardly to the upper face side and is communicated from the first connecting portion 2a side into the circulation route 2 through the plurality of inlet ports 1d provided at an upper portion (in an upper part of the battery pack) of the case main body 1b and then arrives at the neighborhood of the evaporator 4.

The defrost controller 3c is responsible for the defrost control. Here, a starting condition and an ending condition for the defrost control are decided (judged), and the defrost control is performed based on results of the decision (judgment). The starting condition for the defrost control is, for example, that the cooling control ends, that the dehumidification control ends or the like. On the other hand, the ending condition is, for example, that the performance time period of the defrost control is equal to or longer than a criterional period of time.

If the starting condition for the defrost control is satisfied, then the defrost controller 3c outputs a control signal to the evaporator 4 to cut off the communication of the coolant to the core 4a and outputs a control signal to the fan 5 to blow the air in the circulation route 2 in the reverse direction. Further, the flow path switching valves 9a and 9b are controlled to the postures in which the bypass routes 7a and 7b are open, respectively. In other words, in the defrost control, the circulation route 2 is closed and the external air is supplied to the evaporator 4 through the bypass route 7b.

Consequently, water condensed as dew or frosted on the surface of the core 4a of the evaporator 4 is removed. For example, moisture evaporated from the surface of the core 4a is discharged to the outside of the vehicle from the bypass route 7a together with the external air. Further, water condensed into dew on the surface of the core 4a drops into the circulation route 2 and flows out to the outside of the vehicle through the bypass routes 7a and 7b.

[3. Flow Chart]

Figure 4:
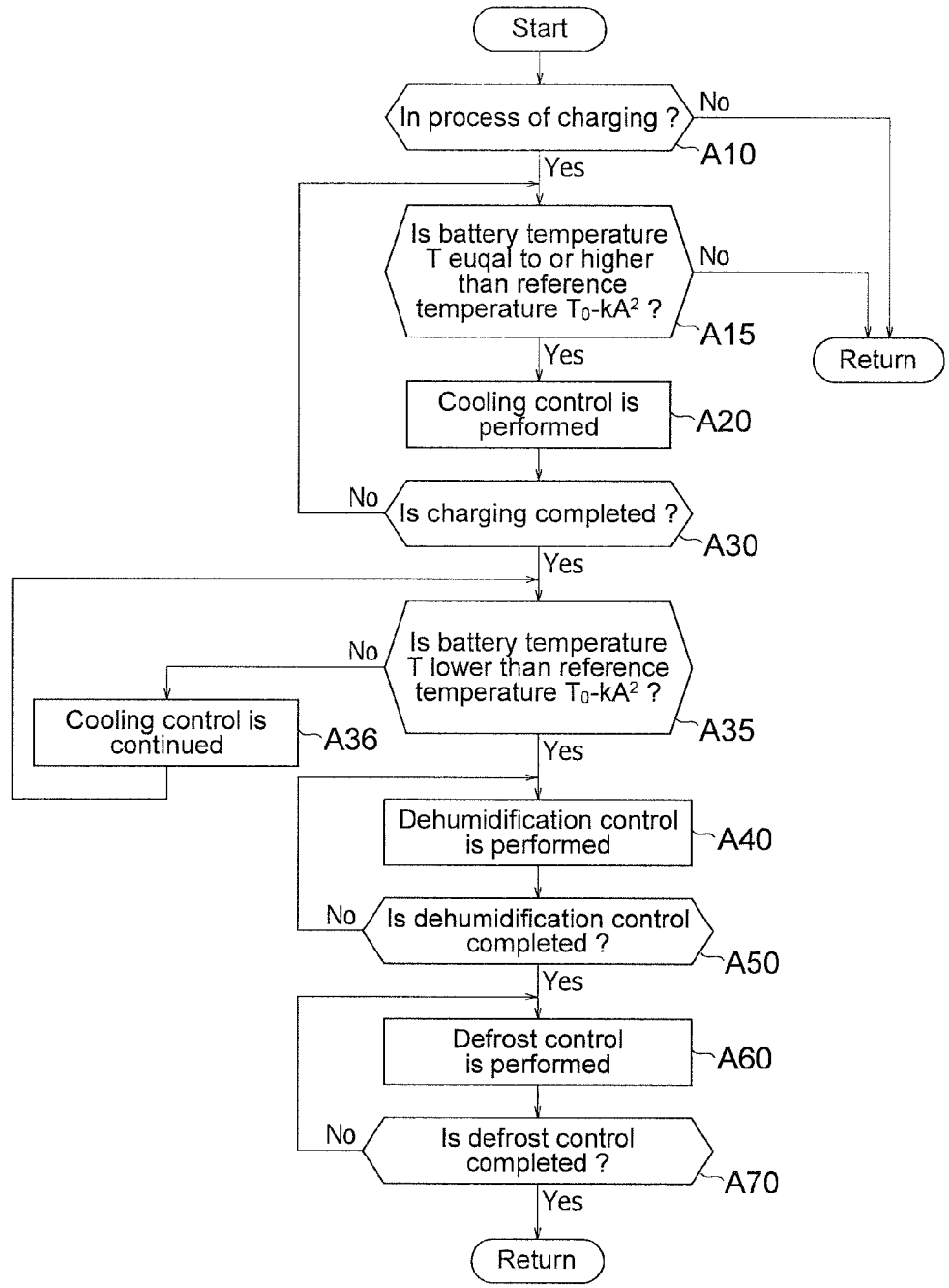
FIG. 4 is a flow chart exemplifying the contents of control performed by the air-conditioning controlling apparatus of FIG. 1.

FIG. 4 is a flow chart schematically illustrating the contents of control executed by the battery air-conditioning ECU 3 described hereinabove. This flow is performed repetitively in the battery air-conditioning ECU 3.

Regarding this flow, it can be supposed as follows: The cooling control is performed upon charging of the battery cells 1a. The starting condition for the dehumidification control and the ending condition for the cooling control are same. The starting condition for the defrost control and the ending condition for the dehumidification control are same.

At step A10, it is decided by the cooling controller 3a whether or not the battery cells 1a are in a process of charging (whether or not charging has been started). If it is decided here that the battery cells 1a are in a process of charging, the processing advances to step A15, but if it is decided that the battery cells 1a are not in a process of charging, the processing of the flow is ended immediately. At step A15, it is decided whether or not the battery temperature T is equal to or higher than the decision temperature $T_0-kA^2$. If this decision condition relating to the battery temperature T is satisfied, then the processing advances to step A20, but if this decision condition is not satisfied, then the processing of the flow is ended immediately. It is to be noted that the decision conditions at steps A10 and A15 correspond to the starting condition for the cooling control.

Figure 5A:
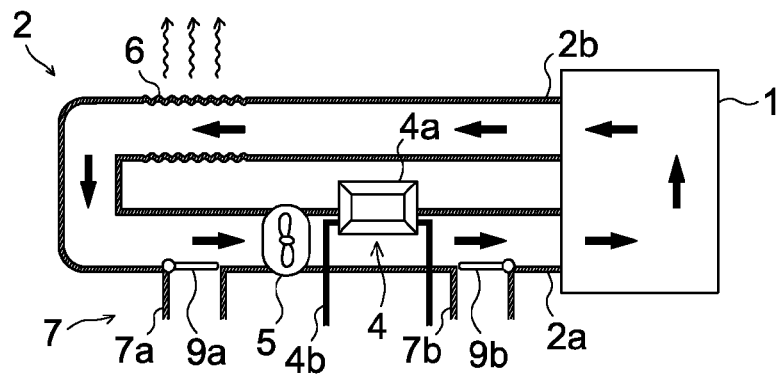
FIGS. 5A, 5B, and 5C are schematic views illustrating control actions by the air-conditioning controlling apparatus of FIG. 1, and wherein FIG. 5A corresponds to a control action upon cooling control, FIG. 5B corresponds to a control action upon dehumidification control and FIG. 5C corresponds to a control action upon defrost control.

At step S20, the cooling control is performed by the cooling controller 3a. At this time, since the battery cells 1a are in a process of charging and generating heat, the internal temperature of the case main body 1b rises. Meanwhile, the cooling control is performed simultaneously with the charging control, and the air in the circulation route 2 is blown so as to circulate in the forward direction. The circulation direction of the air is the forward direction as indicated by arrow marks in FIG. 5(a), and the air warmed in the case main body 1b passes the second connecting portion 2b and is cooled by the heat exchange unit 6 and then is cooled by the evaporator 4 further. The air cooled by the evaporator 4 is introduced into the inside of the case main body 1b from the plurality of inlet ports 1d as illustrated in FIG. 2(a) and is supplied toward the entire battery cells 1a. Consequently, the temperature rising of the battery cells 1a is suppressed effectively.

Figure 6A:
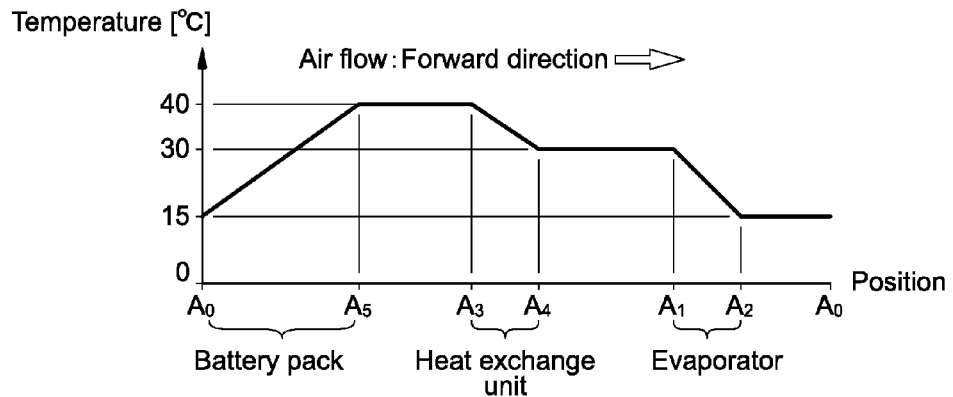
FIGS. 6A and 6B are graphs exemplifying temperature distributions of air on a circulation route of FIG. 1, and wherein FIG. 6A corresponds to a temperature distribution of air upon cooling control and FIG. 6B corresponds to a temperature distribution of air upon dehumidification control.

Here, attention is paid to the temperature distribution of the air circulating along the circulation route 2. For example, as illustrated in FIG. 6A, when the temperature of the air flowing out from the battery pack 1 is around 40 [° C.] and the external air temperature is 25 [° C.], the air is cooled to a temperature around 30 [° C.] by the heat exchange unit 6 and thereafter cooled to a temperature around 15 [° C.] by the evaporator 4. At this time, if it assumed that the coolant temperature of the evaporator 4 is, for example, around −10 [° C.], then the surface of the core 4a is warmed to a temperature around 10 [° C.] by the air therearound. However, since the heat exchange unit 6 is disposed on the upstream side of the evaporator 4, the cooling capacity requested for the evaporator 4 may be reduced by the amount of heat cooled by the heat exchange unit 6.

The air cooled by the evaporator 4 is introduced into the battery pack 1 while it maintains the temperature. Consequently, the heat generation amount that can be absorbed by the battery pack 1 becomes an amount corresponding to a difference between the temperature of the air introduced into the battery pack 1 and the temperature of the air flowing out from the battery pack 1.

At subsequent step A30, it is decided by the cooling controller 3a whether or not the charging of the battery cells 1a is completed. If it is decided here that the charging is completed, then the processing advances to step A35, but if it is decided that the charging is not completed, then the processing returns to step A20.

At step A35, it is decided whether or not the battery temperature T is lower than the decision temperature $T_0-kA^2$. If the decision condition relating to the battery temperature T is satisfied, then the processing advances to step A40, but if the decision condition is not satisfied, then the processing advances to step A36, at which only the cooling control is continued. It is to be noted that, at steps A30 and A35, the ending condition of the cooling control (starting condition of the dehumidification control) is decided, and even if the battery cells 1a are placed into a fully charged stage, the cooling control is continued unless the battery temperature T drops down to some degree.

Figure 5B:
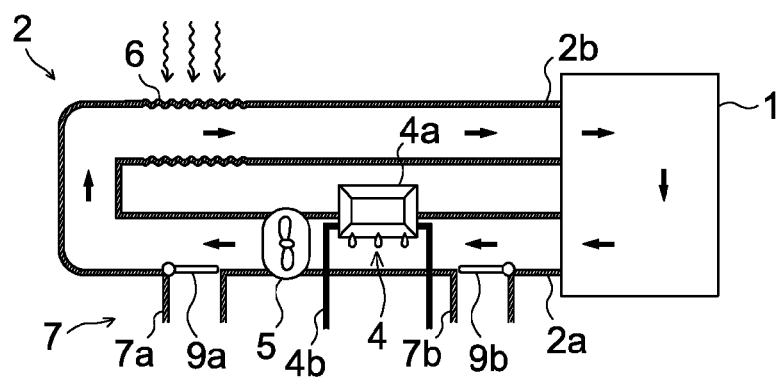

At step A40, the dehumidification control is performed by the dehumidification controller 3b. At this time, since the charging of the battery cells 1a is completed, heat generation is in a stopping state and the internal temperature of the case main body 1b is in a state in which it drops down to some degree. Therefore, in the dehumidification control, the fan 5 is controlled so that the air in the circulation route 2 is circulated in the reverse direction. The circulation direction of the air is reverse to that upon cooling control as indicated by arrow marks in FIG. 5B, and also the flow rate decreases. In particular, the air in the case main body 1b is supplied to the evaporator 4 through the first connecting portion 2a and is cooled in the proximity of the core 4a. Further, moisture in the air is condensed into dew or frosted on the surface of the core 4a and the air in the downstream side with respect to the evaporator 4 becomes dry.

Figure 2B:
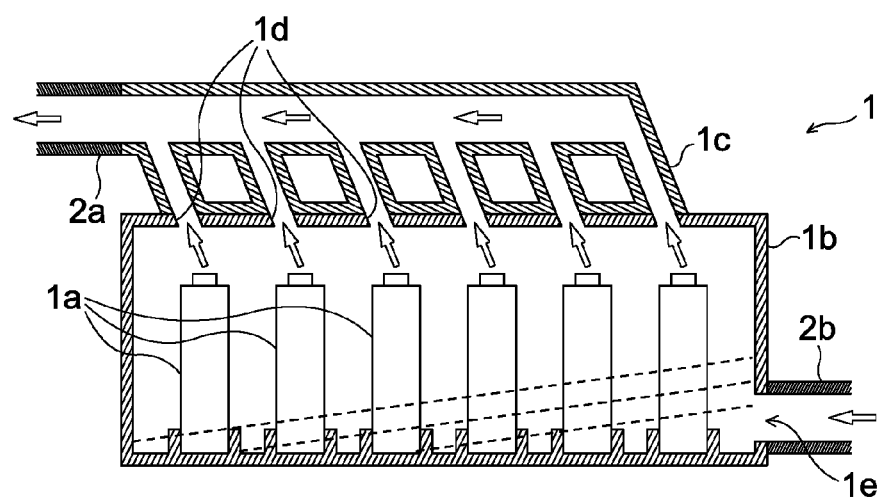

The dry, low temperature air is warmed by the heat exchange unit 6 and is introduced into the case main body 1b from the second inlet port 1e. Further, in the inside of the case main body 1b, the dry air is filled in layers from the lower face side as illustrated in FIG. 2B. It is to be noted that, as the temperature of the dry air introduced from the second inlet port 1e descends lower, the air becomes more likely to accumulate on the lower face side and becomes less likely to mix with the air in the inside of the case main body 1b.

On the other hand, the remaining air in the inside of the case main body 1b is pushed upwardly to the upper face side and flows out from the first connecting portion 2a side into the circulation route 2 through the plurality of inlet ports 1d provided at an upper portion of the case main body 1b. Consequently, the air that contains moisture in the inside of the case main body 1b is successively replaced by the dry air from below. Accordingly, the time-dependent variation of the amount of water (wetness, humidity) in the inside of the case main body 1b upon dehumidification control exhibits a substantially linear variation as indicated by a solid line in FIG. 7, and the amount of water (wetness, humidity) in the air decreases to substantially zero at certain time $t_0$.

Figure 7:
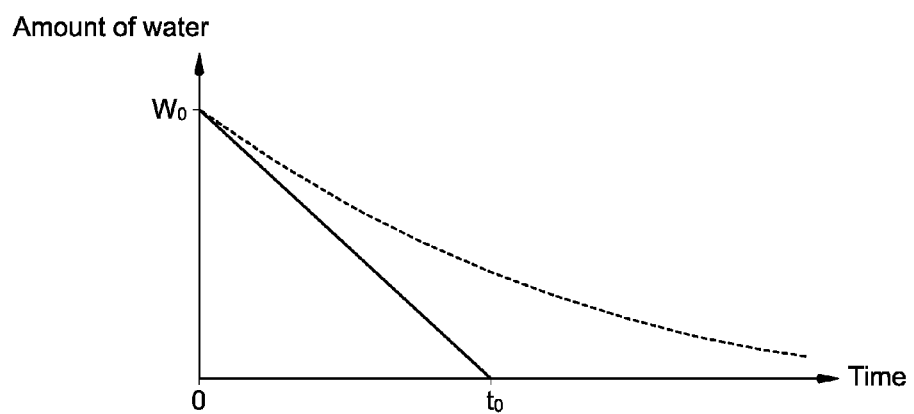
FIG. 7 is a graph schematically illustrating a variation of the amount of water (wetness, humidity) in the battery pack upon dehumidification control.

It is to be noted that a broken line curve illustrated in FIG. 7 indicates a time-dependent variation of the amount of water when the air in the circulation route 2 is circulated in the forward direction upon dehumidification control. In this instance, since the air that contains moisture and the dry air are mixed with each other in the case main body 1b, it can be recognized that, as the amount of water decreases, the decreasing rate decreases (that is, the decreasing rate gets smaller).

Figure 6B:
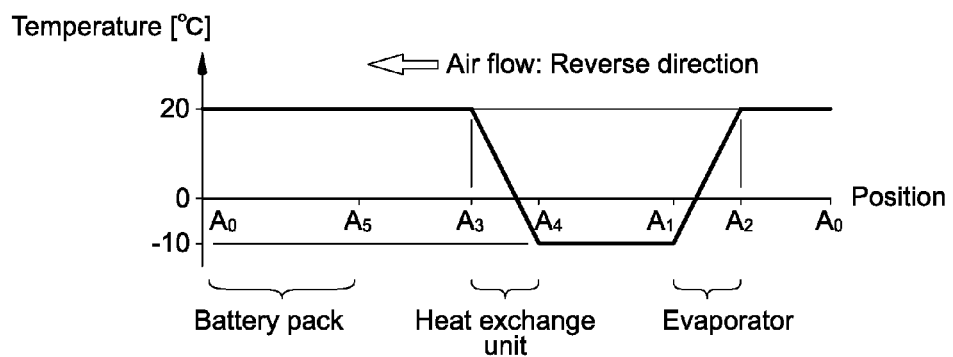

A temperature distribution of the air in the circulation route 2 upon dehumidification control is exemplified in FIG. 6B. When the temperature in the battery pack 1 is around 20 [° C.], the air is cooled immediately by the evaporator 4. If it is assumed that the coolant temperature of the evaporator 4 is, for example, around −10 [° C.], then since the flow rate of the air upon dehumidification control is low, also the temperature of the air drops to a temperature around −10 [° C.]. On the other hand, if the external air temperature is around 25 [° C.], then the air is warmed naturally to a temperature around 15 to 20 [° C.] by the heat exchange unit 6 and then introduced into the battery pack 1. Accordingly, dew condensation or frosting is not formed in the battery pack 1.

At subsequent step A50, it is decided by the dehumidification controller 3b whether or not the dehumidification control is completed. If it is decided here that the dehumidification control is completed, then the processing advances to step A60, but if it is decided that the dehumidification control is not completed, then the processing returns to step A40. Here, the ending condition of the dehumidification control (starting condition of the defrost control) is decided. Unless the condition is satisfied here, the dehumidification control is continued. For example, if the humidity detected by the humidity sensor 12 is lower than the predetermined dehumidification or the performance time of the dehumidification control is equal to or longer than the criterional time period, then the dehumidification control is ended.

At step A60, the defrost control is performed by the defrost controller 3c. At this time, the heat generation of the battery cells 1a is in a stopping state, and the internal temperature of the case main body 1b does not rise. On the other hand, there is the possibility that dew condensation or frost may stick to the core 4a of the evaporator 4 as a result of the immediately preceding dehumidification control. Therefore, by the defrost control, the circulation route 2 is closed and the flow path switching valves 9a and 9b are controlled to the postures in which the bypass routes 7a and 7b are opened thereby, respectively. Further, by the evaporator 4, supply of the coolant to the core 4a is cut off and the cooling function and the moisture condensation function stop.

Figure 5C:
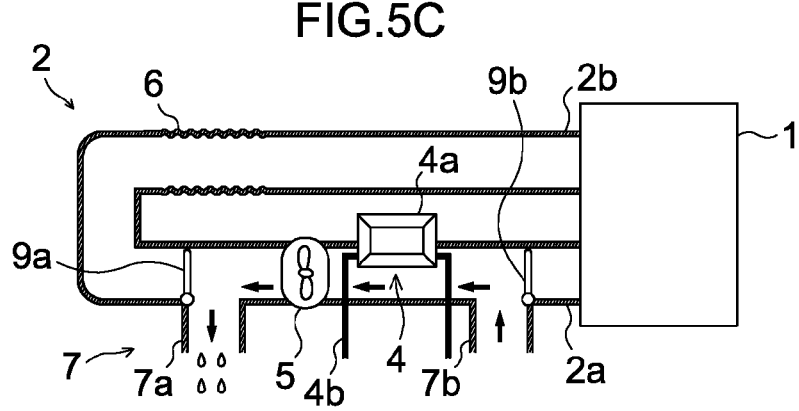

If the fan 5 is driven in such a state as described above, the external air is supplied to the evaporator 4 through the bypass route 7b as indicated by arrow marks in FIG. 5C, and moisture evaporated from the surface of the core 4a is discharged to the outside of the vehicle together with the external air from the bypass route 7a. Further, the moisture condensed into water drops on the surface of the core 4a drops in the circulation route 2 and flows out to the outside of the vehicle through the bypass routes 7a and 7b.

At subsequent step A70, it is decided by the defrost controller 3c whether or not the defrost control is completed. If it is decided here that the defrost control is completed, then the processing of this flow is ended, but if it is decided that the defrost control is not completed, then the processing returns to step A60. Here, the ending condition for the defrost control is decided, and the defrost control is maintained until the condition here is satisfied. For example, if the performance time of the defrost control continues for a criterional period of time or more, then the defrost control is ended.

[4. Working, Effects]

In the air-conditioning controlling apparatus for the battery pack 1 described above, the air-conditioning control of the air in the circulation route 2 causes the air to circulate in the opposite directions upon cooling control and upon dehumidification control. By such a control configuration as just described, the temperature distribution shape of the air in the circulation route 2 is made different as illustrated by FIG. 6A and FIG. 6B to vary the temperature characteristic. It is to be noted that the positions $A_0$ and $A_5$ correspond to the positions of the first connecting portion 2a and the second connecting portion 2b of the circulation route 2, respectively, and the positions $A_1$ and $A_2$ correspond to the positions of an end portion of the evaporator 4 on the second connecting portion 2b side and an end portion of the evaporator 4 on the first connecting portion 2a side, respectively. Further, the positions $A_3$ and $A_4$ correspond to the positions of an end portion of the heat exchange unit 6 on the second connecting portion 2b side and an end portion of the heat exchange unit 6 on the first connecting portion 2a side, respectively.

For example, focusing on the temperature gradient between the end portion $A_1$ of the evaporator 4 on the second connecting portion 2b side and the end portion $A_2$ of the evaporator 4 on the first connecting portion 2a side, it can be seen that reverse gradients are exhibited by FIG. 6A and FIG. 6B. Stated differently, it is made possible to change the temperature of the air in the proximity of the first connecting portion 2a or the second connecting portion 2b by a great amount without changing the original function of the evaporator 4 to cool the air or without additionally providing an additional apparatus, such as a heater, that consumes superfluous energy. Accordingly, it becomes possible to adjust the temperature of the air to be introduced into the battery pack 1 comparatively freely by a simple configuration and to appropriately control the temperature and the humidity of the air in the battery pack 1.

Further, in the air-conditioning controlling apparatus described above, the heat exchange unit 6 is positioned on the upstream side upon cooling control with respect to the evaporator 4. In other words, after the air of a high temperature in the battery pack 1 is cooled once by the heat exchange unit 6, the heat thereof is removed by the evaporator 4. Consequently, the temperature of the air to be introduced into the evaporator 4 becomes lower than the temperature of the air in the battery pack 1. Accordingly, a workload of the evaporator 4 can be reduced, and a cooling effect of the battery pack 1 upon cooling control can be improved.

On the other hand, upon dehumidification control, the heat exchange unit 6 is positioned on the downstream side with respect to the evaporator 4. In other words, the air whose heat is removed by the evaporator 4 is heat-exchanged with the external air by the heat exchange unit 6 and supplied to the battery pack 1. Consequently, the temperature to be introduced into the battery pack 1 becomes higher than the temperature of the air whose heat is removed by the evaporator 4. Accordingly, dew condensation in the battery pack 1 can be prevented.

It is to be noted that, as illustrated in FIG. 6A and FIG. 6B, the temperature gradient between the end portion $A_3$ of the heat exchange unit 6 on the second connecting portion 2b side and the end portion $A_4$ of the heat exchange unit 6 on the first connecting portion 2a side does not become such a reverse gradient as that provided by the evaporator 4. This fact indicates that the function of the heat exchange unit 6 varies in response to the circulation direction of the air. By using the heat exchange unit 6 that carries out heat exchange with the external air in this manner, the cooling function and the temperature raising function (heating function) can be switched automatically using the external temperature as a reference. Therefore, there is an advantage that the temperature and the humidity of the air in the battery pack 1 can be controlled more appropriately.

Further, in the air-conditioning controlling apparatus described above, the cooling control is performed upon charging of the battery cells 1a, and the dehumidification control is performed after completion of the cooling control. By performing the cooling control upon charging in which the heat radiation amount from the battery cells 1a is great, the characteristic of the battery cells 1a can be maintained, the life of the battery cells 1a can be assured, the charging efficiency can be improved and the charging time period can be reduced. Further, even if charging is completed, the cooling control is still continued as long as the battery temperature T is high. Therefore, for example, the degradation preventing effect of a battery characteristic can be further enhanced. On the other hand, since the dehumidification control is performed after the end of the charging by which heat radiation from the battery cells 1a is settled, moisture in the air in the circulation route 2 becomes more likely to be condensed into dew by the evaporator 4 and the heat removal effect can be improved.

Further, in the air-conditioning controlling apparatus described above, the flow rate of the fan 5 upon dehumidification control is set lower than that upon cooling control. Therefore, even if the temperature of the air in the circulation route 2 is high, it is easy to maintain the temperature of the core 4a of the evaporator 4 lower than the dew point, and dew condensation or frost can be produced with certainly. Furthermore, by reducing the flow rate of the air, the contact time between the core 4a and the air can be elongated, and it is possible to facilitate dew condensation of moisture. By those, the dehumidification effect by the evaporator 4 can be enhanced further.

Further, in the air-conditioning controlling apparatus described above, the bypass routes 7a and 7b for discharging condensed water or frost in the circulation route 2 to the outside of the circulation route 2 upon defrost control are provided. By blowing the external air to the evaporator 4 through the bypass routes 7a and 7b, it is possible not only to allow water drops sticking to the surface of the core 4a of the evaporator 4 or the vaporized moisture to flow out but also to readily melt frost frozen on the surface of the core 4a. Consequently, moisture in the circulation route 2 can be discharged readily, and the discharging speed and the discharging efficiency can be improved.

Further, in the air-conditioning controlling apparatus described above, the introduction direction of the air into the case main body 1b upon cooling control is the downward direction(from-top-to-bottom direction) as illustrated in FIG. 2A, and the cooling air moves from above to below through an open space between the plurality of battery cells 1a. Therefore, the cooling air can be supplied to the entire battery cells 1a, and the cooling performance can be improved. On the other hand, since the air is supplied from below to above of the case main body 1b upon dehumidification control, the air ventilation (air circulation) of the case main body 1b can be improved, and air that contains moisture can be replaced with dried air. Consequently, the temperature and the amount of water can be reduced in short time.

Further, in the air-conditioning controlling apparatus described above, since the inlet ports 1d upon cooling control are provided at a plurality of locations, it is easy to diffuse cooling air even to the every corner of the case main body 1b and the cooling performance can be improved. Further, where the position of the inlet ports 1d is set in accordance with the disposition of the accommodated battery cells 1a as illustrated in FIG. 2A, cooling air can be supplied uniformly to the plurality of battery cells 1a, and there is an advantage that the individual battery cells 1a can be controlled to a uniform temperature.

In this manner, with the air-conditioning controlling apparatus for the battery pack 1 described hereinabove, by circulating the air in the opposite directions upon cooling control and upon dehumidification control, the temperatures when the air cooled by the evaporator 4 is introduced into the battery pack 1 (namely, the temperature in the proximity of the first connecting portion 2a upon cooling control and the temperature in the proximity of the second connecting portion 2b upon dehumidification control) can be made different from each other. Consequently, the temperature and the humidity of the air in the battery pack 1 can be adjusted.

Further, by reversing the circulation direction of the air, the temperature distribution characteristic can be varied drastically by a great amount as illustrated in FIG. 6A and FIG. 6B, and adjustment of the temperature and the humidity of the air in the battery pack 1 is facilitated. Consequently, the environment around the battery cells 1a can be dried, the battery cells 1a can be cooled efficiently, and degradation of the battery cells 1a can be suppressed.

[5. Modifications]

While, in the embodiment described above, the fan 5 is used to circulate the air in the circulation route 2, particular measures (a tangible device or means) for circulating the air are not limited to this. For example, an alternative configuration that utilizes an air pump or a vacuum pump to circulate the air may be adopted. Any measures that can at least reverse the circulation direction of the air exhibits similar effects to those of the embodiment described hereinabove. Such a replacement similarly applies also to the evaporator 4 or the heat exchange unit 6, and arbitrary measures can be adopted for particular thermal exchange.

Further, regarding control of the battery air-conditioning ECU 3, in the flow chart illustrated in FIG. 4, the cooling control is performed upon charging of the battery cells 1a, and the starting condition for the dehumidification control and the ending condition for the cooling control are same as each other while the starting condition for the defrost control and the ending condition for the dehumidification control are same as each other. However, the starting conditions and the ending conditions are not limited to them. Various conditions are applicable.

For example, not only upon charging, but also upon discharging (for example, when the battery is consumed by an electric equipment mounted on the vehicle, when the vehicle is traveling or the like) or when the battery temperature T detected by the temperature sensor 11 is equal to or higher than a criterional value irrespective of any other condition, the cooling control may be performed. Or, the dehumidification control may be performed in response to the battery temperature T or the humidity when the cooling control is completed. By performing the cooling control or the dehumidification control suitably in response to the state of the battery cells 1a in this manner, it becomes possible to make it easier to maintain the character of the battery cells 1a and extend the lifetime of the battery.

Further, in the embodiment described hereinabove, the air-conditioning controlling apparatus has the pipeline structure that takes in, upon the defrost control, the external air from the bypass route 7b and blows the external air to the evaporator 4 and then discharges the air from the other bypass route 7a. However, a simpler structure may be adopted. For example, a drainage hole and an openable and closeable lid member may be provided in a lower part of the evaporator 4 such that, upon defrosting, the lid member is opened to release the circulation route 2 to the outside to perform drainage.

It is to be noted that, while the exemplified embodiment described above is directed to cooling and dehumidification of the battery pack 1 mounted on the vehicle 10, the application target of the present air-conditioning controlling apparatus for a battery pack is not limited to this. For example, the present air-conditioning controlling apparatus for a battery pack can be applied not only to a hybrid car or a fuel cell car but also to a vehicle, an electronic apparatus, a computer or the like having a battery under control of temperature management and humidity management. On the other hand, taking into consideration that the present air-conditioning controlling apparatus for a battery pack preferably includes measures (a device or means) for removing heat of the air in a battery pack or measures (a device or means) for performing heat exchange between the air and the external air, it can be used suitably for an apparatus that incorporates a battery and is used outdoors.

DESCRIPTION OF REFERENCE CHARACTERS 1 battery pack
  1a battery cell
  1b case main body
  1d inlet port (first inlet port)
  1e second inlet port
2 circulation route
3 battery air-conditioning ECU (air-conditioning controller)
4 evaporator (heat removal unit)
5 fan (direction controller)
6 heat exchange unit (heat exchanging unit)
7, 7a, 7b bypass route
9, 9a, 9b flow path switching valve
10 vehicle
11 temperature sensor (temperature detection unit)
12 humidity sensor (humidity detection unit)

The invention claimed is:

1. An air-conditioning controlling apparatus for a battery pack, comprising:
  a battery case, accommodating a battery cell therein, the battery case having a first connecting portion and a second connecting portion;
  a circulation route, one end of which being connected to the first connecting portion and another end of which being connected to the second connecting portion, to allow air in the battery case to recirculate;
  a heat removal unit, provided in the circulation route outside the battery case, that cools and dehumidifies air in the batter case upon cooling the battery cell; and
  a direction controller that controls an air flow in the circulation route in a first direction when the heat removal unit is operated to cool the air, and controls the air flow in a second direction, opposite to the first direction, when the heat removal unit is operated to dehumidify the air.

2. The air-conditioning controlling apparatus for a battery pack according to claim 1, further comprising:
  a heat exchange unit provided on the circulation route on an upstream side of the heat removal unit with respect to the air flow in the first direction and performs heat exchange between the air and external air.

3. The air-conditioning controlling apparatus for a battery pack according to claim 1, further comprising:
an air-conditioning controller that performs cooling control for cooling the air upon charging or discharging of the battery cell and performs dehumidification control for dehumidifying the air after the charging ends.

4. The air-conditioning controlling apparatus for a battery pack according to claim 3, wherein
the air-conditioning controller decreases a flow rate of air to be circulated in the circulation route upon the dehumidification control from a flow rate of air to be circulated in the circulation route upon the cooling control.

5. The air-conditioning controlling apparatus for a battery pack according to claim 1, further comprising:
a bypass route that allows dew condensation sticking to the heat removal unit upon the dehumidification to flow out from the circulation route.

6. The air-conditioning controlling apparatus for a battery pack according to claim 1, further comprising:
a first inlet port provided in an upper part of the battery pack and introduces, upon the cooling of the air, the air from the circulation route into the battery pack; and
a second inlet port provided in a lower part of the battery pack and introduces, upon the dehumidification of the air, the air from the circulation route into the battery pack.

7. The air-conditioning controlling apparatus for a battery pack according to claim 6, wherein
the first inlet port is provided at a plurality of locations of an upper face of the battery pack and supplies the air toward the entire battery cell accommodated in the battery pack; and
the second inlet port is provided at a corner portion of the battery pack and supplies the air in layers from the lower face side of the battery pack.

8. The air-conditioning controlling apparatus for a battery pack according to claim 1, wherein the direction controller includes a fan provided in the circulation route and outside the battery case.

* * * * *

UNITED STATES PATENT AND TRADEMARK OFFICE
CERTIFICATE OF CORRECTION

PATENT NO. : 9,515,359 B2  
APPLICATION NO. : 13/983986  
DATED : December 6, 2016  
INVENTOR(S) : Koichi Taniyama et al.

Page 1 of 1

It is certified that error appears in the above-identified patent and that said Letters Patent is hereby corrected as shown below:

On the Title Page

At item (75), Inventors, change the first-named inventor from "Koichi Taniyama, Minato-ku (JP)" to --Koichi Taniyama, Tokyo (JP)--.

Signed and Sealed this  
Eighteenth Day of April, 2017

Michelle K. Lee  
*Director of the United States Patent and Trademark Office*